Sept. 1, 1953
D. E. MOLDOWAN
2,650,532
SOD CUTTER
Filed June 17, 1950
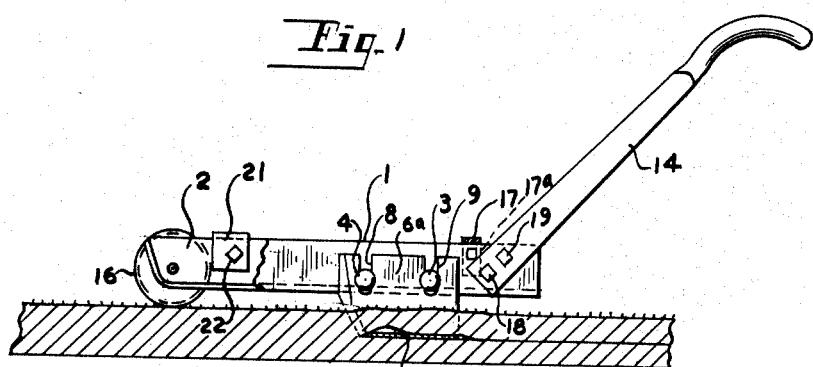
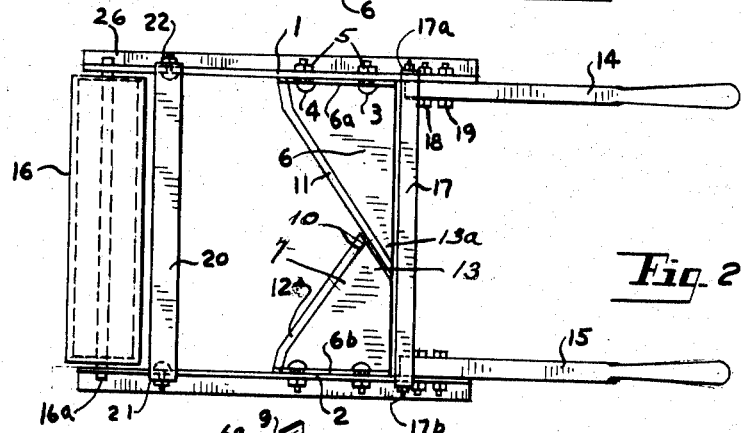
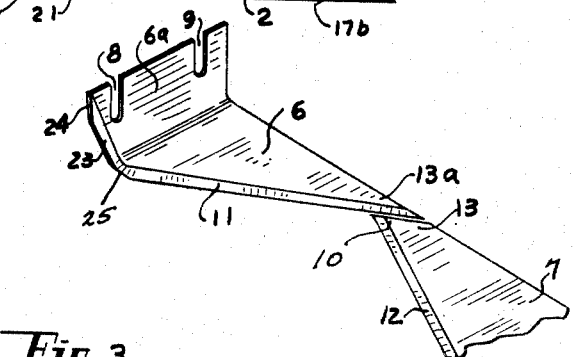
INVENTOR.
DIONIS E. MOLDOWAN.
BY
Wisner & Sloman
ATTORNEYS Patented Sept. 1, 1953

2,650,532

UNITED STATES PATENT OFFICE 2,650,532

SOD CUTTER

Dionis E. Moldowan, Detroit, Mich.

Application June 17, 1950, Serial No. 168,751

1 Claim. (Cl. 97—226)

This invention relates to a sod cutter, and more particularly to a sod cutter construction which includes a pair of cooperating triangularly shaped horizontally arranged blades whose apexes are arranged in longitudinally overlapped relation so as to prevent clogging of roots or other matter therebetween.

It is a further object of this invention to provide a pair of cooperating sod cutting blades whose sharpened rearwardly extending edges cooperate to provide a cutting apex which is laterally disposed from the pointed end of one of said blades to thereby prevent clogging with the roots or other matter between the ends of said blades during the sod cutting operation.

These and other objects will be seen from the following specification and claim in conjunction with the appended drawing in which:

Fig. 1 is a side elevational view of the sod cutter with a portion thereof broken away and sectioned.

Fig. 2 is a plan view thereof: and

Fig. 3 is a partially broken away perspective view of the blades illustrating their arrangement.

It will be understood that the above drawing illustrates merely a preferred embodiment of the invention, and that other embodiments are contemplated within the scope of the claims hereafter set out.

Referring to the drawing the sod cutter includes a pair of parallel spaced frame elements 1 and 2 which are provided with longitudinal flanges 26 along their lower edges and which project outwardly therefrom.

Transversely arranged cross bars 17 and 20 are interposed between frame members 1 and 2 arranged inwardly of their ends, with the turned down portions 17a of cross bar 17 secured to the rear portions of frame members 1 and 2 by the bolts 17b and their respective nuts. Similarly the downturned portions 21 of cross bar 20 are rigidly secured to forward portions of frame members 1 and 2 by the bolts and their nuts 22.

Rearwardly extending angularly arranged parallel spaced handles 14 and 15 are positioned at the rear portion of the hollow framework, being respectively secured to frame elements 1 and 2 by the bolts 18 and 19 and their respective nuts.

The front supporting roller 16 is arranged transversely of the forward portion of the sod cutter frame and its central axle 16a is journaled through corresponding openings in the forward portions of the frame elements 1 and 2 as shown in Fig. 2, in such fashion that the leading edge of the roller 16 is arranged forwardly of the leading edges of the frame elements 1 and 2.

It will be noted also that the roller 16 is arranged adjacent to and forwardly of the cross bar 20 as shown in Fig. 2.

The framework 1, 2, 17 and 20 has suspended therefrom a pair of sharpened triangularly shaped sod cutting or severing blades 6 and 7 both of which have upturned flanges 6a and 6b at their outer ends adapted for mounting and securing upon the inner surfaces of frame members 1 and 2, respectively.

Upright slots 8 and 9 are formed within the upper portions of the blade supporting flanges 6a and 6b, and the bolts 4 and 3 respectively extend through the slots 8 and 9 and through corresponding transverse openings in frame elements 1 and 2, with said bolts being secured by the nuts 5 in the manner illustrated in Fig. 2.

As shown in Fig. 3, the blades have rearwardly inclined sharpened edges 11 and 12, the outer portions of which terminate in the sharpened straight portions 25, and these in turn merge with the upright sharpened edges 23 of the blade supporting flanges 6a and 6b. It will be noted that as shown in Fig. 3 a portion 24 adjacent the top of the side flanges 6a and 6b is flat and non-sharpened, as it is apparent that this portion will be adjacent the frame elements 1 and 2, and therefore in a non-cutting position. However it is apparent that the remainder of the downwardly depending portions 23 of the end flanges 6a and 6b are sharpened and will be effective in defining the longitudinal margins of the strip of sod which is cut by the present sod cutter.

Sod cutting blade 6 has a pointed and sharpened end 13a whereas the corresponding oppositely arranged blade 7 has an angularly cut portion 13 which is arranged forwardly of, parallel to and in close proximity with aforesaid pointed end 13a of blade 6. The outer pointed end 10 of blade 7 is thus laterally disposed with respect to the pointed end 13a to thereby define between the rearwardly extending sharpened edges 11 and 12 a cutting apex which is laterally displaced from the pointed end 13a. Furthermore it is seen that the pointed end 10 of blade 7 is arranged in longitudinally overlapped relation to the pointed end 13a.

And it is by this construction and arrangement of the pointed ends of the cooperating blades that the present sod cutter is fully effective so that there is no clogging with roots or other matter between the common pointed ends of the blades 6 and 7.

As viewed in Fig. 2 the non-inclined rear edges of the blades 6 and 7 are in alignment with each other and are arranged at right angles to the respective frame members 1 and 2, with said rear edges being positioned closely adjacent and forwardly of the rear cross bar 17.

Having described my invention reference should now be had to the claim which follows for determining the scope thereof.

I claim:

In a sod cutting device, in combination, a supporting frame having a pair of transversely spaced generally parallel bars, a pair of oppositely mounted transversely extending sod cutting blades, each blade comprising a flat substantially right triangular horizontal portion and an upturned substantially rectangular flange portion at its shorter base, each of said upturned flange portions being provided with means for rigidly and adjustably attaching same to one of said parallel bars with the horizontal portions in coplanar relation, the hypotenuse edge of each of said horizontal portions being sharpened and positioned as the leading edge of the blade, the inner end portion of one of said blades being cut back on a line parallel with and closely adjacent to the sharpened leading edge of the other blade, whereby the cut back end portion of the latter blade overlaps a portion of the sharpened leading edge of the other blade in the common longitudinal plane to form a rearwardly extending cutting apex which is laterally displaced from the pointed end of the other of said blades, the longer longitudinal base edges of the triangular portions of said blades being aligned and arranged at right angles to said upturned rectangular flange portions, the outer leading edges of the flat horizontal portions of said blades terminating in relatively short sharpened portions arranged parallel to said base edges, and the leading vertical edges of said upturned flange portions being sharpened.

DIONIS E. MOLDOWAN.

References Cited in the file of this patent

UNITED STATES PATENTS

| Number | Name | Date |
| --- | --- | --- |
| 3,748 | Lauve | Sept. 17, 1844 |
| 748,675 | Weber | Jan. 5, 1904 |
| 788,421 | McInnerny | Apr. 25, 1905 |
| 1,058,607 | Larose | Apr. 8, 1913 |
| 1,179,795 | Beaupre | Apr. 18, 1916 |
| 1,463,106 | Weber | July 24, 1923 |
| 1,829,335 | Blue | Oct. 27, 1931 |
| 2,506,371 | Lint | May 2, 1950 |